United States Patent [19]

Okada et al.

[11] Patent Number: 5,522,016
[45] Date of Patent: May 28, 1996

[54] DIGITALLY CONTROLLED PRINTING

[75] Inventors: Aki Okada; Eli Amir, both of Agoura Hills; Leo J. Rheingold, Thousand Oaks, all of Calif.

[73] Assignee: Dataproducts Corporation, Woodland Hills, Calif.

[21] Appl. No.: 59,972

[22] Filed: May 13, 1993

[51] Int. Cl.$^6$ ................................................. G06K 15/00
[52] U.S. Cl. ............................................ 395/108; 395/102
[58] Field of Search .................................. 395/108, 102, 395/117, 101, 105, 110, 111, 115, 116; 358/296; 346/76 PH, 108, 107 R; 347/12, 41, 39, 40, 42

[56] References Cited

U.S. PATENT DOCUMENTS

| | | | |
|---|---|---|---|
| 4,198,642 | 4/1980 | Gamblin | 347/41 |
| 4,272,771 | 6/1981 | Furukawa | 347/12 |
| 4,401,991 | 8/1983 | Martin | 347/41 |
| 4,509,058 | 4/1985 | Fischbeck | 347/39 |
| 4,963,894 | 10/1990 | Lebeau et al. | 358/296 |
| 4,989,019 | 1/1991 | Loce et al. | 346/108 |
| 5,044,796 | 9/1991 | Lund | 395/102 |
| 5,059,984 | 10/1991 | Moore et al. | 347/41 |
| 5,070,345 | 12/1991 | Lahut et al. | 347/41 |
| 5,079,571 | 1/1992 | Eriksen | 358/500 |
| 5,111,218 | 5/1992 | Lebeau et al. | 346/107 R |
| 5,119,108 | 6/1992 | Hatakeyama | 346/76 PH |
| 5,239,312 | 8/1993 | Merna et al. | 347/41 |

FOREIGN PATENT DOCUMENTS

PCTUS9002457 12/1990 WIPO .

*Primary Examiner*—Mark R. Powell
*Assistant Examiner*—Dov Popovici
*Attorney, Agent, or Firm*—Spensley Horn Jubas & Lubitz

[57] ABSTRACT

A method and apparatus for performing printing on a substrate on the basis of data representing a pattern composed of a plurality of parallel rows of discrete image elements. In a known manner, successive strips of image elements are formed on the substrate, each strip being constituted by a given number of the parallel rows which extend in a first direction on the substrate and the successive strips being spaced apart at intervals in a second direction on the substrate perpendicular to the first direction such that a boundary exists between each two adjacent strips, adjacent rows in each strip being spaced from one another with an inter-row spacing in the second direction and the interval between strips of parallel rows of image elements having a nominal value substantially equal to the product of the inter-row spacing multiplied by an integer which is one greater than the given number of rows in a strip. In order to eliminate visible seams at the boundaries between adjacent strips, the data are monitored to determine whether the pattern represented by the data contains at least one line of image elements which extends in the second direction across the boundary between two adjacent strips; and, in response to a determination that the pattern does contain such line of image elements, the space between the two adjacent strips is reduced by about an integral multiple of one row spacing, and the printer control signals for at least one row adjacent the boundary are modified.

9 Claims, 2 Drawing Sheets

```
   a b c d e f g h              a b c d e f g h              a b c d e f g h
 1 1 1 0 1 1 1 1 1          ⎧  1                          1
 2 1 1 1 0 0 0 1 1          ⎪  2                          2
 3 1 1 1 0 0 1 1 0          ⎪  3                          3
 4 0 1 1 1 1 1 0 0          ⎪  4                          4
 5 1 1 1 1 1 0 0 0  ⎫ 22  2 ⎨  5                          5
 6 1 1 1 1 0 0 0 1  ⎬        ⎪  6                          6
 7 1 0 1 0 0 0 1 1  ⎭        ⎪  7                          7
 8 1 1 0 0 0 1 1 0          ⎪  8                          8
 9 1 0 1 0 0 1 1 1          ⎩  9                          9
 --------------          G →                              10
10 1 0 1 0 1 1 1 1          ⎧ 10                          11
11 1 1 1 1 0 0 1 1          ⎪ 11                          12
12 0 1 1 0 0 1 1 1          ⎪ 12                          13
13 0 1 0 0 1 1 1 1          ⎪ 13                          14
14 1 0 0 1 1 1 1 0  ⎫ 24  4 ⎨ 14                          15
15 0 0 1 1 1 1 0 0  ⎬        ⎪ 15                          16
16 0 1 1 1 1 0 0 1  ⎭        ⎪ 16                          17
17 1 1 1 1 0 0 1 1          ⎪ 17                          18
18 1 1 1 0 0 1 1 1          ⎩ 18                          19
 --------------          G →                              20
19 1 1 1 1 0 0 1 1  ⎫        ⎧ 19                          21
20 1 1 1 1 1 0 1 1  ⎬ 26  8 ⎨ 20                          22
21 1 1 1 1 1 1 1 1  ⎭        ⎩ 21
    FIG. 1                    FIG. 2                       FIG. 3
```
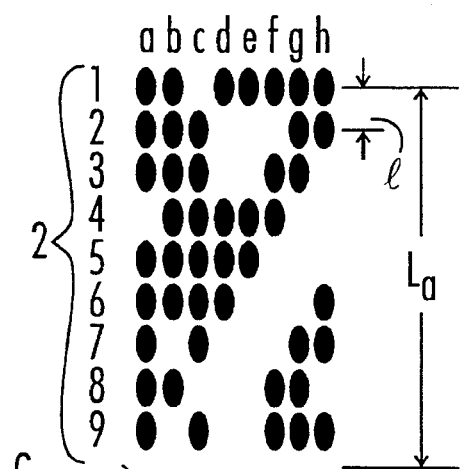
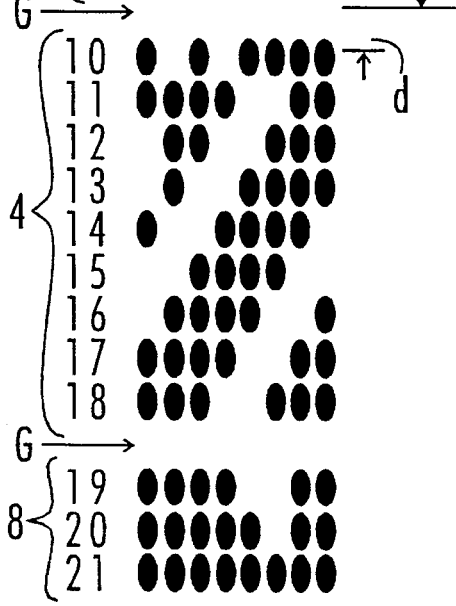
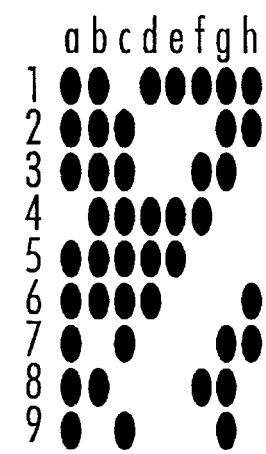
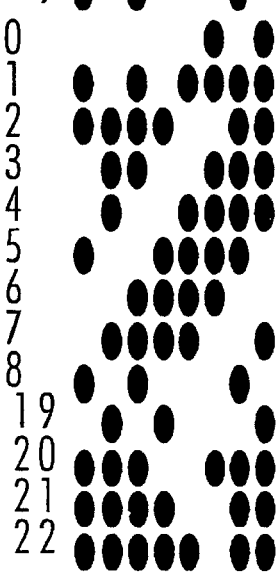

DIGITALLY CONTROLLED PRINTING

BACKGROUND OF THE INVENTION

The present invention relates to electronically controlled matrix printing in which text and/or graphics images are printed by a printing device on a substrate, typically a paper or plastic sheet, under control of a digital signal. The invention particularly relates to printing of this type in which the digital signal represents pixels, or image elements, which are divided into a plurality of parallel strips, with each strip being composed of a plurality of parallel rows.

Printing of this type is performed in a variety of printers, including dot matrix printers having an array of pins which can individually contact the substrate to form a dot thereon, and ink jet printers having an array of nozzles which jet individual drops of solvent-based or hot melt, i.e. thermoplastic, inks onto the substrate. Printing of this type is also performed by distributed matrix printers.

Theoretically, such printing could also be performed with an array of light emitting elements, such as LEDs, which illuminate points on a sheet of photosensitive or thermosensitive paper. However, known printers of this type conventionally have a single long row of light emitting elements which print one row of image dots at a time.

In all existing printers in which printing is effected on a succession of parallel strips on the substrate, with each strip containing a plurality of parallel rows of image elements, a stepwise relative movement, commonly referred to as an indexing movement, must be performed between the substrate and the printing device before printing each successive strip. The transporting devices for effectuating such movement are designed to give each movement step a magnitude which will assure that all of the rows of a complete image will have a constant spacing.

However, given the small magnitude of the inter-row spacing, which is typically 0.083 mm, it has not been possible to construct a transporting device which effects the movement in a sufficiently accurate and repeatable manner to avoid every type of image imperfection due to row spacing variations at the boundaries between strips.

FIG. 2 shows one example of a type of image imperfection which appears if the movement effected by the transporting device is only a few hundredths of a millimeter longer than its nominal, or desired value. While in FIG. 2, and FIG. 3, ink dots are shown surrounded by white spaces, in practice, the dots will overlap and substantially fill the inter-dot spaces. In FIG. 2, portions 2 and 4 of two strips of printed image elements, e.g. ink dots, are separated by a boundary 6. Three rows of a portion 8 of a third strip are separated from portion 4 by a second boundary 6. On the substrate, each strip covers a width $L_0$ and the inter-row spacing, i.e. the spacing between adjacent rows of dots, has a value, l. The first strip contains dot rows 1–9 and the next strip contains dot rows 10–18. If the indexing movement performed after printing rows 1–9 has a value exactly equal to $L_0$, image imperfections of the type described above will not occur.

However, in practice, the indexing movements will rarely have exactly the desired value. Rather, because of inherent imperfections in the transporting mechanism, and/or position detection errors, each indexing movement will be longer or shorter than the desired, or nominal, value. The magnitude of the error will, naturally, not be predictable, but a maximum value for the error magnitude can be determined. In FIG. 2, the indexing movement error between printing of the strip containing portion 2 and the strip containing portion 4 is +d, which can be assumed to be the maximum error magnitude that will occur. It can further be assumed that in a typical printer, d<l.

If, as shown, the image elements represent a pattern which extends across a boundary 6, then the positioning error will result in the appearance of a visible seam, or continuous white or light line, along boundary 6.

This defect is most apparent when printing graphics images since normal text printing is performed so that the seam at each boundary between strips of image elements is located in a blank area between lines of printed text.

In order to eliminate defects of this type, it has been proposed to intentionally reduce the magnitude of the indexing movement and to use the data intended for printing the last row of one strip to control printing of both that row and the first row of the next strip. Such a technique is disclosed in U.S. Pat. No. 4,272,271 which issued to Furukawa on Jun. 9, 1981, and is shown in FIG. 3 herein, which will be described below.

While this technique will eliminate visible seams, it has the drawback of reducing the effective width of each strip, thereby resulting in an increase in the number of strips required to fill a substrate sheet and an increase in the time required to print each sheet.

SUMMARY OF THE INVENTION

It is a primary object of the present invention to eliminate visible seams from patterns printed in the manner described above without significantly increasing printing time.

Another object of the invention is to reduce the length of an indexing step only when the pattern being printed includes portions which extend in the indexing direction between the strips printed just before and after the indexing step.

The above and other objects are achieved, according to the invention, by a method and apparatus for performing printing on a substrate on the basis of printer control signals derived from data representing a pattern composed of a plurality of parallel rows of discrete image elements, by forming successive strips of image elements on the substrate, each strip being constituted by a given number of the parallel rows which extend in a first direction on the substrate and the successive strips being spaced apart at intervals in a second direction on the substrate perpendicular to the first direction such that a boundary exists between each two adjacent strips, adjacent rows in each strip being spaced from one another with an inter-row spacing in the second direction and the spacing interval of the strips having a nominal value equal to the product of the inter-row spacing multiplied by an integer which is one greater than the given number of rows in a strip. The invention is implemented by: monitoring the data to determine whether the pattern represented by the data contains at least one line of image elements which extends in the second direction across the boundary between two adjacent strips; and in response to a determination that the pattern does contain such line of image elements, reducing the space between the two adjacent strips by about an integral multiple of one inter-row spacing, and modifying the printer control signals for at least one row adjacent the boundary.

The invention can be applied to any printing device in which print elements are produced in strips, each strip being composed of a plurality of rows of such elements, and in which a relative physical movement is performed between the printing device and the substrate between successive strip printing operations. Systems of the type under consideration can be those in which either the printing device or the substrate moves during printing of each strip and, conversely, either the substrate or the printing device is moved to effect each indexing movement. Typically, printing devices of the type employed may have an array of pins or nozzles disposed in a linear or grid pattern, with each pin or nozzle being associated with one respective row of each strip to be printed.

BRIEF DESCRIPTION OF THE DRAWINGS

FIG. 1 is a pictorial diagram showing print data arranged in a pattern corresponding to the printed pattern formed from that data.

FIGS. 2 and 3 are pictorial views showing printed patterns without a correction and with a correction for boundary seams, respectively.

DESCRIPTION OF THE PREFERRED EMBODIMENTS

Figure 4:
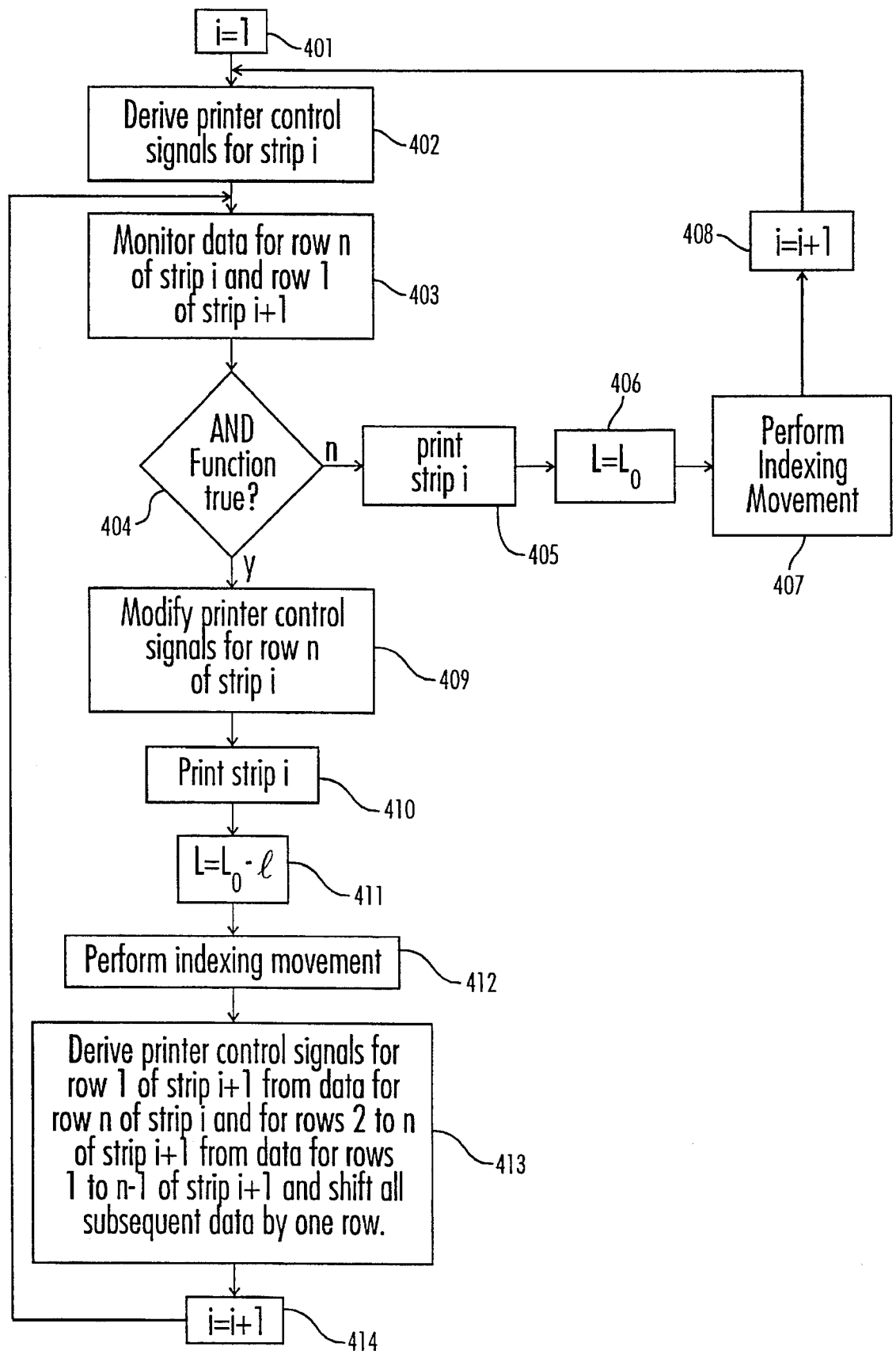
FIG. 4 is a programming flow diagram illustrating one embodiment of the invention.

The essential features of this invention will be described with reference to FIG. 1, which depicts binary data representing strip portions 2, 4 and 8 of FIG. 2, and FIG. 3, which is a view similar to that of FIG. 2 and shows a modified print pattern produced when the invention is implemented.

This binary data includes groups of data 22, 24 and 26 intended for printing the strip portions 2, 4 and 8, respectively, shown in FIG. 2. For explanatory purposes only, the data is shown in FIG. 1 in a spatial arrangement corresponding to the spatial arrangement of the resulting printed pattern.

Each row to be printed on a substrate can be considered to be divided into a series of print element positions, the print element positions shown in FIGS. 1–3 being represented by the letters a through h. Each row of data is represented by a respective numeral, extending along the left-hand side of each figure.

According to one basic aspect of the present invention, the printing operation is modified only if it appears, from monitoring of the binary data shown in FIG. 1, that there is at least one line of print elements, or dots, which extends vertically across boundary 6 between two adjacent strips. Since, in the example illustrated, each print element is represented by a binary "1" this monitoring can be performed by deriving the logical AND function of each pair of binary values located at the same print element position in the two rows, for example rows 9 and 10, adjacent boundary 6. For example, with respect to strip portions 2 and 4, the logical AND function would be derived for the binary data values at print element positions, a, c, f, g and h. If any one of these logical AND functions is true, i.e. evaluates as a logic "1" it is concluded that at least one vertical line in the printed pattern extends across boundary 6, in response to which the printing procedure will be modified.

This modification includes reducing the magnitude of the nominal indexing movement by an amount equal to an integral multiple of the inter-row spacing, l, printing bottom rows of the first strip and top rows of the second strip on the basis of the binary data produced for one or more of those rows and, for printing the second strip, effectively shifting the print data downward by an amount corresponding to the integral multiple, the purpose of this being to retain the desired positioning of the printed pattern on the substrate.

One example of the result of such modifications is shown in FIG. 3, where the magnitude of the indexing movement has been reduced by an amount equal to l and the printing for rows 9 and 10 is performed on the following basis. In row 9, every even print element position, b, d, f and h is left blank, and printing at each odd print number position, a, c, e, g, etc. is controlled by the corresponding binary data for row 9. Thus, in this case, where the binary data for row 9 contains a "1" at print element positions a, c and g, a print element, or dot, is printed at those positions of row 9. For printing row 10, which has been shifted upwardly by an amount equal to one inter-row spacing, every odd print position, a, c, e, g, etc., is left blank and printing at each even position, b, d, f, h, etc. is controlled on the basis of the binary data for those positions for row 9. Thus, in this case, the binary data for positions 9b and 9d have a value of "0" so that no print elements are printed at those positions of row 10, while the binary data at positions 9f and 9h have a value of "1" so that print elements, or dots, are printed at positions f and h of print row 10. Then, the binary data originally intended for rows 10–17 are shifted to control of the printing members associated with rows 11–18 of the printed pattern.

It will be noted, from a comparison of FIGS. 2 and 3, that since the printing information based on the print data for printing the second strip is shifted down by one row, the resulting print elements will appear at the same horizontal position as they would have if the printing procedure had not been modified.

A second operating sequence according to the invention is also depicted with respect to portions 4 and 8 of second and third strips of printed matter, associated with binary data groups 24 and 26. With respect to the third strip to be printed, only three rows of data are shown in view of the fact that the modifications performed pursuant to the invention only involve the boundaries between strips.

The difference in appearance between the printed patterns shown in FIGS. 2 and 3 could be similar to that which would be produced by one embodiment of the method disclosed in U.S. Pat. No. 4,272,771. However, a basic difference between the present invention and the methods disclosed in that patent is that according to the invention a determination is made of whether such modification should be effected before printing a strip. If the monitoring of the binary data, shown in FIG. 1, reveals that one of the boundary lines between two adjacent strips, either the last line of the first strip to be printed or the first line of the next strip to be printed, does not include any print elements, or dots, the printing procedure will not, in accordance with the invention, be modified. This situation will normally occur if, for example, only text material is being printed on a portion of a substrate, since the print elements representing normal text material will not extend to the boundary rows of strips. Therefore, if an error exists in the indexing movement, this will not produce any apparent imaging defect. By limiting the modification of the printing procedure in accordance with the present invention to those situations where indexing movement errors can produce an image imperfection, the number of strips required to print a complete page can be kept to a minimum, and hence any reduction in the printing speed resulting from the practice of the invention will be minimized.

According to other embodiments of the invention, the modification in the printing procedure, when the monitoring of binary data indicates that a modification should be made, could be varied by reducing the indexing movement from its nominal value, L, to a value L−nl, where n=2 or 3. However, this variation would further reduce printing speed, and may prove desirable only in limited situations.

According to another alternative, the distribution of print elements between the two rows adjacent a boundary between strips could be varied such that the data associated with the last row of the first one of the two strips is utilized to control printing at two or three successive print element positions of the last row of the first strip, followed by printing at the next two or three print element positions of the first row of the next strip to be printed, and so on. However, there is presently no basis for asserting that this variation would produce a further improvement in the appearance of the resulting image.

The method according to the invention would be particularly useful if printers of the type under consideration were to be employed for printing bar codes, in which a light seam could produce bar code reading errors.

Advantageously, the technique according to the invention could be implemented by providing suitable programming to an existing printer control device, and thus would not require any structural modification of the printing system. FIG. 4 is a flow chart illustrating the steps that would be performed by one non-limiting example of such programming. In this flow chart, i is the number of the strip to be printed next, the first strip on a page being strip 1. Each strip is composed of n rows, row 1 being the first row of the strip and row n being the last row of the strip. The normal indexing movement is identified as $L_0$ and the inter-row spacing is 1.

In step 401, i is initially set to 1 and then, in step 402, printer control signals are derived in the normal manner for strip i. Then, in step 403, the data for row n of strip i and row 1 of strip i+1 are monitored, in the manner described above, by obtaining the AND function of each pair of data values which are at the same print element position in their respective rows. If any one of the AND functions evaluates as a logic "1", or is true, this is determined in decision step 404.

If none of the AND functions has a value of 1, this signifies that there is no print element position along the boundary between the two adjacent strips where a print element appears in both rows, so that the modification of printing according to the invention need not be performed. In this case, strip i will be printed in step 405, the indexing movement will be set to $L_0$ in step 406, and the indexing movement will then be performed in step 407. Then, in step 408, the value of i is incremented by 1 and the operation returns to step 402.

If, on the other hand, the AND function evaluates as true in decision block 404, the printer control signals for row n of strip i are modified, in the manner described above, in block 409. Then, in block 410, strip i is printed, in block 411 the indexing step is set to the modified value, in which the nominal value is reduced by the magnitude of an inter-row spacing, and in block 412, an indexing movement is performed.

Then printer control signals for strip i+1 are derived in the manner described in block 413. In this procedure, all of the data is shifted by one row, and the shifted data is employed for subsequent operations. In a typical printer control system, there is some point where the binary data for printing of each row is transferred serially under control of clock signals which operate such that the data for each row is transferred during a given interval. Shifting of all of the print data by one row can be effected in a simple manner, simply by suppressing the clock signal or signals for a period equal to one of those intervals. Then, in block 414, i is incremented by one and operation returns to block 403.

The flow diagram of FIG. 4 focuses on control of printing for a single page. When the end of a page is reached, this occurrence will be determined by any procedure which is conventional in the art and printing of the new page will resume with function block 401.

Reverting to FIGS. 2 and 3, it will be noted that if the value for d is less than that illustrated, the center lines of rows 9 and 10 will be closer together than is illustrated in FIG. 3. However, the result according to the invention will still be achieved. In addition, it is anticipated that there will be occasions when d has a negative value, i.e. the actual unmodified indexing step has a value smaller than $L_0$. In this case, the operating modifications according to the invention can cause the center line of row 10 to be higher than that of row 9 and can even cause partial overlapping of print elements on rows 9 and 11. This could cause a barely perceptible distortion of the print image. However, the primary object of the present invention is to prevent thin white seams from appearing in the printed image and the production of a slightly darker seam region on certain occasions will not be objectionable.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than tile foregoing description, and all changes which come within the meaning and range of equivalency of the claims are therefore intended to be embraced therein.

What is claimed:

1. In a method for performing printing on a substrate on the basis of printer control signals derived from data representing a pattern composed of a plurality of parallel rows of discrete image elements, by forming strips of image elements in succession on the substrate, each strip being constituted by a given number of the parallel rows which extend in a first direction on the substrate and the successive strips being spaced apart at intervals in a second direction on the substrate perpendicular to the first direction such that a boundary exists between each two adjacent strips, adjacent rows in each strip being spaced from one another with an inter-row spacing in the second direction and the interval between strips of parallel rows of image elements having a nominal value substantially equal to the product of the inter-row spacing multiplied by an integer which is one greater than the given number of rows in a strip, the improvement comprising:

monitoring the data to determine whether the pattern represented by the data contains at least one line of image elements which extends in the second direction across the boundary between two adjacent strips; and in response to a determination that the pattern does contain such line of image elements, reducing the space between the two adjacent strips by about an integral multiple of one inter-row spacing, and modifying the printer control signals for at least one row adjacent the boundary.

2. A method as defined in claim 1 wherein said step of modifying comprises using the data for at least one row adjacent the boundary to control printing of at least the two rows adjacent the boundary.

3. A method as defined in claim 1 wherein a first one of the two adjacent strips is printed before a second one of the two adjacent strips, the first one of the two adjacent strips has last row of image elements adjacent the boundary and the second one of the two adjacent strips has a first row of image elements adjacent the boundary, and wherein said step of monitoring comprises comparing data representing each image element in the last row of the first one of the strips with data representing a respective image element in the first row of the second one of the strips which lies on the same line extending in the second direction.

4. A method as defined in claim 3 wherein each row is composed of a plurality of adjacent image element positions, the plurality of positions being divided into a first group of image element positions and a second group of image element positions, and wherein said step of modifying the printer control signals is carried out to cause the printer control signals to control printing at the first group of image element positions of the last row of the first one of the strips and to control printing at the second group of image element positions of the first row of the second one of the strips.

5. A method as defined in claim 4 wherein said step of modifying the printer control signals comprises using the data representing the pattern of image elements in each but the last row of the second one of the strips to control printing of image elements in a succeeding row of the second one of the strips.

6. A method as defined in claim 4 wherein each image element position of the first group is interposed between successive image element positions of the second group.

7. A method as defined in claim 4 wherein the first group is composed of a plurality of sets of successive image element positions, the sets being separated from one another by image element positions of the second group.

8. A method as defined in claim 1 wherein the integral multiple is unity.

9. Apparatus for performing printing on a substrate on the basis of printer control signals derived from data representing a pattern composed of a plurality of parallel rows of discrete image elements, by forming strips of image elements in succession on the substrate, each strip being constituted by a given number of the parallel rows which extend in a first direction on the substrate and the successive strips being spaced apart at intervals in a second direction on the substrate perpendicular to the first direction such that a boundary exists between each two adjacent strips, adjacent rows in each strip being spaced from one another with an inter-row spacing in the second direction and the interval between strips of parallel rows of image elements having a nominal value substantially equal to the product of the inter-row spacing multiplied by an integer which is one greater than the given number of rows in a strip, the improvement comprising:

means for monitoring the data to determine whether the pattern represented by the data contains at least one line of image elements which extends in the second direction across the boundary between two adjacent strips; and means operative, in response to a determination that the pattern does contain such line of image elements, for reducing the space between the two adjacent strips by about an integral multiple of one inter-row spacing, and for modifying the printer control signals for at least one row adjacent the boundary.

* * * * *